United States Patent

Ackerman, Jr.

[15] 3,693,020

[45] Sept. 19, 1972

[54] PHOTODEGRADOMETER
[72] Inventor: Hervey W. Ackerman, Jr., Westfield, N.J.
[73] Assignee: M & T Chemicals Inc., New York, N.Y.
[22] Filed: Nov. 4, 1969
[21] Appl. No.: 873,827

[52] U.S. Cl. ......250/219 FR, 250/83.3 UV, 250/220, 356/205
[51] Int. Cl. ............................................G01n 21/30
[58] Field of Search......250/219 R, 219 W, 83.3 UV, 250/83 CD, 222, 71, 71.5, 205; 73/150 X; 356/201, 202

[56] References Cited

UNITED STATES PATENTS

| 3,246,150 | 4/1966 | Stoddart | 250/71.5 |
| 3,300,643 | 1/1967 | McCall | 250/71 |
| 3,376,416 | 4/1968 | Rutland | 250/71.5 |
| 3,487,209 | 12/1969 | Perry | 250/71.5 |
| 1,969,606 | 8/1934 | Hall | 73/150 |
| 2,195,726 | 4/1940 | Jameson | 173/150 |
| 2,712,415 | 7/1955 | Piety | 250/219 |
| 2,905,646 | 9/1959 | Khol et al. | 250/219 |
| 3,405,268 | 10/1968 | Brunton | 250/219 |

Primary Examiner—James W. Lawrence
Assistant Examiner—D. C. Nelms
Attorney—Lewis C. Brown, Kenneth G. Wheeless and Robert P. Grindle

[57] ABSTRACT

Methods and apparatus are provided for the simultaneous impartation and measurement of photoinitiated degradation of a plurality of resin samples by the application thereto of actinic radiation while continuously measuring the radiation passing through the resins so as to determine constantly the effectiveness quantitatively of different stabilizer components contained in the resins from initial exposure through the maximum rate of discoloration, and during a period of time substantially reduced from corresponding conditions produced under natural weather conditions. In addition, single means are provided for producing the radiation and the photodegradation, as well as means for constantly monitoring and measuring the radiation intensity alone and the degrading effects thereof on the resin samples, and under constantly maintained temperature conditions.

10 Claims, 8 Drawing Figures

PATENTED SEP 19 1972

INVENTOR.
HERVEY W. ACKERMAN, Jr.

BY Robert P. Grindle

ATTORNEY

PATENTED SEP 19 1972 3,693,020

INVENTOR.
HERVEY W. ACKERMAN, Jr.
BY Robert P. Grindle
ATTORNEY

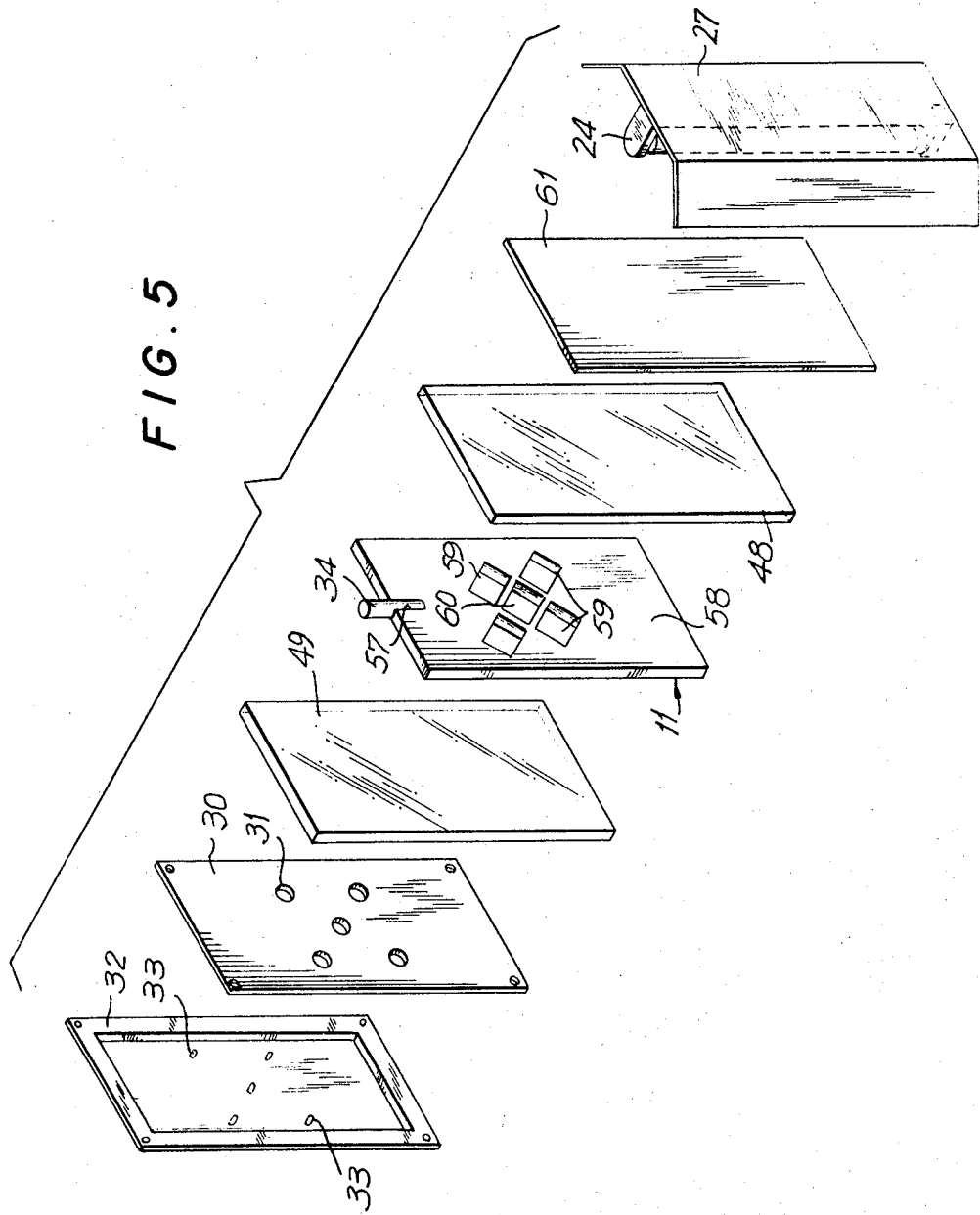

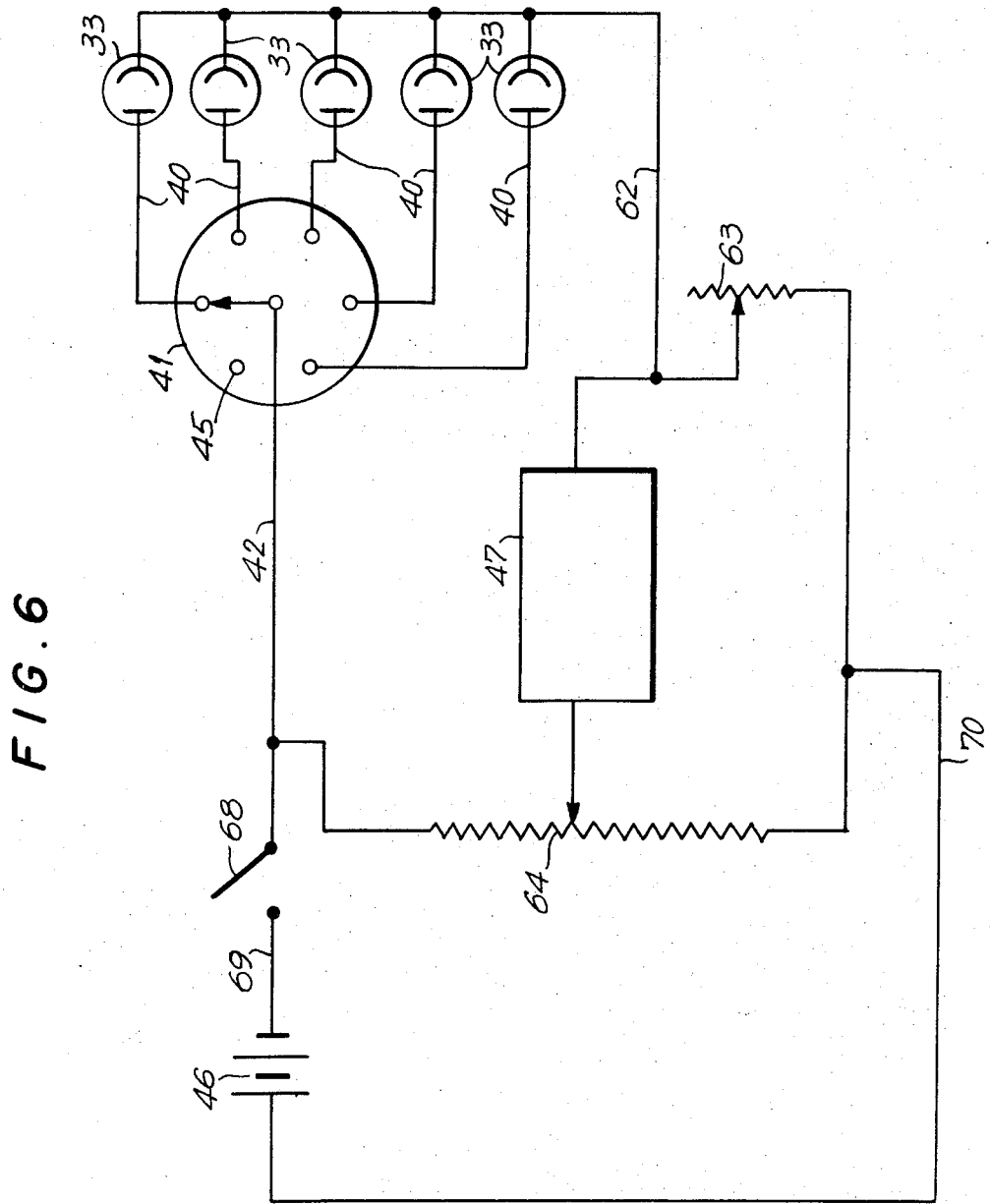

PHOTODEGRADOMETER

Generally speaking, this invention relates to methods and apparatus for measuring the degrading effect of light on a plurality of different resins having different stabilizer components contained therein for inhibiting degradation by the light. More particularly, this invention relates to methods and apparatus for simulating exposure conditions, typically weather, and the effect of light and heat on a plurality of resins containing different stabilizer components for the simultaneous impartation and measurement of photoinitiated degradation of the resins by the application thereto of intense, low wave length ultraviolet light (actinic radiation) while continuously monitoring the radiation passing through the resins so as to determine on a constant and/or periodic basis the effectiveness quantitatively of the different stabilizer components contained in the resins from initial exposure through the maximum rate of discoloration, and under conditions whereby the induced discoloration is produced over a substantially shorter period of time than would be the case under natural weather conditions so as to provide information quickly as to the effectiveness of the various stabilizers in the resins.

As is well known, resins in various forms have become an important item of commerce today. They are used in a plurality of sizes, shapes and applications because they can be easily formed, extruded or molded into a plurality of shapes, while being easily worked and handled during the formulation and processing thereof.

For example, polyvinyl chloride is used in a wide variety of products because of its versatility. Because of the large demand for these products, efficient processes have been developed to make the resins economically. However, the resins, in most instances, require special additives so that they may be fabricated into useful objects. Polyvinyl chloride (PVC), for example, can not be fabricated into useful objects without these special additives because it decomposes at temperatures needed for the processing thereof. Many techniques have been used to determine the effect of the addition of stabilizers to the resins for controlling the melt viscosity and discoloration thereof at temperatures within the range of around 200°C.

Such studies, particularly with respect to PVC, have provided an experimental basis for the details providing theories for the stabilization of PVC against thermal degradation. These theories provide bases for choosing which components will be added to the various resins to determine and test the effectiveness thereof. The results also provide a guide for planning further experiments to define the effect of temperature, concentration and time on the melt viscosity and discoloration of the resins. With the use of instrumental techniques, distraction caused by subtle details and interruptions when subjective comparisons are made by individuals are avoided.

With techniques being derived for determining on an experimental basis theories for stabilization of resins such as PVC against thermal degradation, attention has also been directed to the problems of the stability of these resins against photodegradation because they are being used increasingly in outside applications where they are exposed to weather conditions. It is to this problem that this invention is specifically directed.

As well understood, resins such as polyvinyl chloride, when exposed to atmospheric conditions are affected as to their color by this exposure. Therefore, in the past, it became necessary to consider this degradation from light sources and tests were developed to expose resin samples having a variety of different stabilizer components by placing them in such locales as Arizona so that they would be exposed to intense natural sunlight radiation for a period of time. Such procedures have proved unsatisfactory in certain instances because the time period necessary for producing and determining the effectiveness of resins containing a variety of stabilizers has been at least 3 months and in some instances up to several years in order to appraise the effectiveness of the stabilizer components of the resins.

Furthermore, the weather conditions are not always the same because the actinic component of sunlight varies in intensity both daily and seasonally and, as a result, it is difficult to assess the amount of light incident on the resin samples. Also, variations in the temperature conditions of the area where the samples were being tested and cloudiness produce certain variations which cannot be effectively measured. In other words, no standard basis can be made from exposing samples to normal weather conditions merely because of the changeability thereof.

As well understood, further, it is not practical from a commercial standpoint to have to wait for a year in order to determine whether or not a particular newly developed stabilizing system is appropriate for bringing out a commercially acceptable new product.

In the past, attempts have been made to overcome these problems by providing devices that control the exposure of resin samples to light, humidity and/or heat. However, these devices do not provide means for appraising the effects of the exposure on the samples, either during the time of exposure or after the exposure has been completed. Appraisal of the effects is made after the fact, subjectively, by human observation. With such an arrangement, cards containing actual test pieces are obtained by intermittent sampling and used to record the results of each experiment. As noted above, certain problems may arise from such a procedure in that human error may occur from distractions caused by the environment in which the appraisal is being made at any one time. Furthermore, different people observing the results may interpret them differently.

Furthermore, certain "controlled exposure" devices have been developed for the periodic measurement of the amount of light that passes through an essentially transparent sample during the period of time during which the sample is changing in nature due to conditions impressed on it. With such an arrangement, not only is the exposure controlled but the response of the samples to that exposure is measured. However, such devices are directed to exposure of samples to heat because measurement is made of the melting phenomena of the samples and light is used only to detect the changes in the samples with regard to their susceptibility to heat exposure. In other words, measurement of the light was only used to determine the effect of heat on the samples as opposed to any effect of light on the color of the samples.

According to this invention, however, methods and apparatus are provided for appraising quantitatively the effect of stabilizers in counteracting the discoloring effect of light energy in such resins as PVC, and under conditions whereby an entirely different temperature range is considered than previously used for measuring the effect of thermal degradation. The effects of the two above-noted types of degradation are entirely different, because, for example, processing PVC requires heating at temperatures approaching 200° C. whereas during hot weather conditions in Arizona, black panel temperatures used for testing only reach temperatures within the range of up to about 75° C. (170° F.). The temperature difference of 125° C. changes reaction rates by a factor of 6,000 or more; that is, 1 minute at 200° C. might expand to 1 week at 150° F. or 1 year at 45° F. The extrapolation is so great that the effect of the lower temperature range on the photochemistry of such resins as PVC must be appraised independently to see which reactions are important with respect to "use" conditions as opposed to "processing" conditions which are entirely different.

With the arrangement herein, a plurality of resin samples containing a particular stabilizer system to be tested are exposed to a continuous and unvarying source of actinic radiation. Furthermore, a photocell arrangement is provided for measuring and/or monitoring the discoloration of these samples on a continuous basis so as to provide continuous information as to the extent of discoloration under a particular radiation intensity for varying periods of time. In addition, the photocell arrangement herein provides for simultaneous measurement of the radiation intensity without a sample interposed therebetween, and also a blank radiation intensity reading so as to provide a "white" and "dark" reading for providing a lower and an upper limit for a range of measurement. Furthermore, recording and timing means are provided and connected to the photocell arrangement through an appropriate electrical circuit so that various individual ones of the samples can be measured one after the other after a particular per-set time interval, and with the time interval of the individual readings being pre-set. With this arrangement, each individual sample can be measured and compared by taking a reading for each sample over an equal time basis of, for example, 5–10 seconds so as to get a reading of the various samples after say 10 minutes exposure to the particular radiation intensity provided.

Furthermore, a heater and fan arrangement is provided so as to maintain a constant temperature within the environment of the samples so that no matter what period of time has taken place for exposure of the samples to the radiation intensity, the temperature of the environment in which the samples are being measured will have a constant effect on the readings and on the photoinduced degradation. The heating element in the airflow provided for the sample chamber is connected to a thermocouple placed adjacent the samples to measure the temperature and activate and deactivate the heating means for the air flowing over the samples so as to maintain this constant temperature.

One object of the invention, therefore, is to provide a sample method for measuring the effect of photodegradation on a plurality of samples containing different stabilizer systems in order to measure the effect of the stabilizer systems on the samples.

Another object of the invention is to provide a method for such measurement which simulates weather conditions in an accelerated manner so that the effect of the radiation can be measured over a much shorter period of time than would be the case if such samples were exposed to natural sunlight, and in the absence of any interfering conditions which might vary the environment to which the samples are being exposed. A further object of this invention is to provide such an arrangement and method as noted above in which there is a simultaneous impartation of degradation by the application of actinic radiation and constant measurement of the effects of the radiation on the samples being tested so as to provide measurement of the effects of the radiation over different periods of time by means other than human observation.

Still another object of this invention is to provide apparatus of the character described which utilizes a source of actinic radiation for imparting and measuring and/or monitoring simultaneously the effects of the radiation on a plurality of resin samples having different stabilizer systems contained therein for determining the effects of the radiation on the samples, and including means for maintaining a constant temperature in the sample measuring environment, and means for recording and timing the time of exposure and degree of degradation.

Other objects and advantages of this invention will be apparent from the following description, the accompanying drawings, and the appended claims.

IN THE DRAWINGS:

FIG. 5 is an exploded perspective view of the various elements disposed adjacent the specimen compartment of the apparatus for embodying and practicing this invention;

FIG. 6 is a diagramatic or schematic indication of the electrical circuits and mechanical aspects of apparatus embodying and for practicing this invention;

Figure 7:
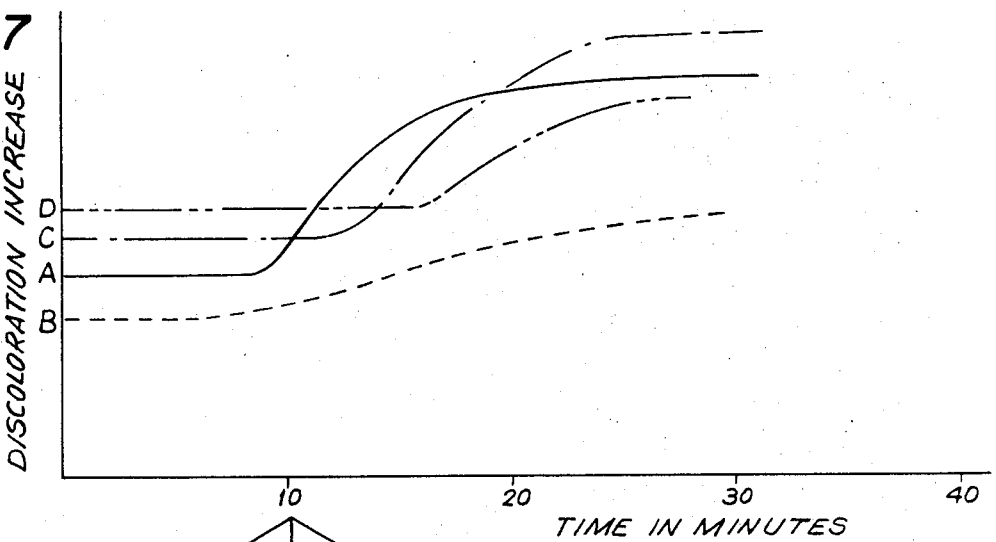
Figure 8:
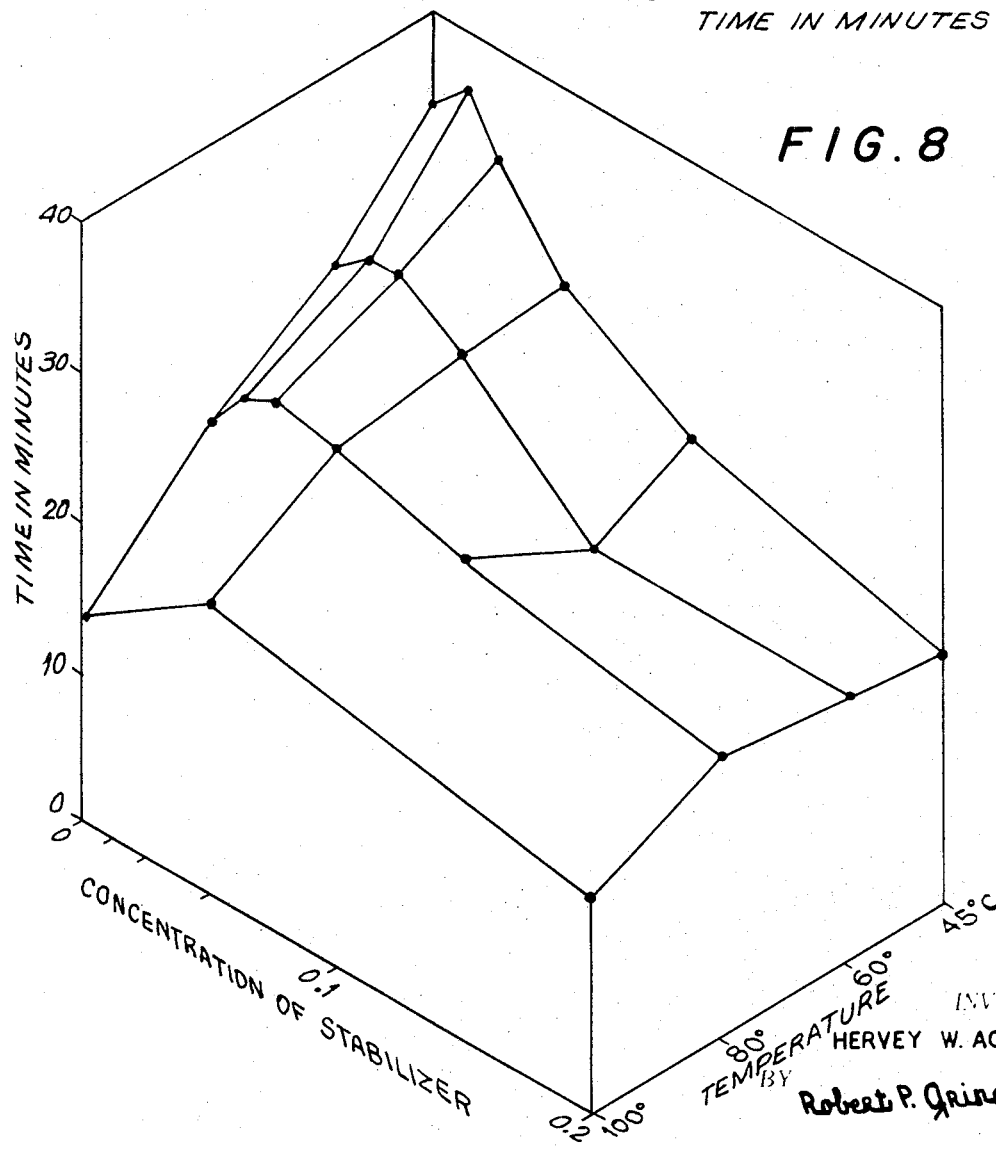

FIG. 7 is a showing of representative profiles obtained by apparatus embodying and for practicing this invention and showing representative polyvinyl chloride resin samples having disposed therein different stabilizer systems; and FIG. 8 is an illustration of a correlation of data from many runs such as those represented in FIG. 7, obtained through the use of the apparatus in accordance herewith showing the effect upon a particular resin sample of varying concentrations of stabilizers and temperature ranges.

Figure 1:
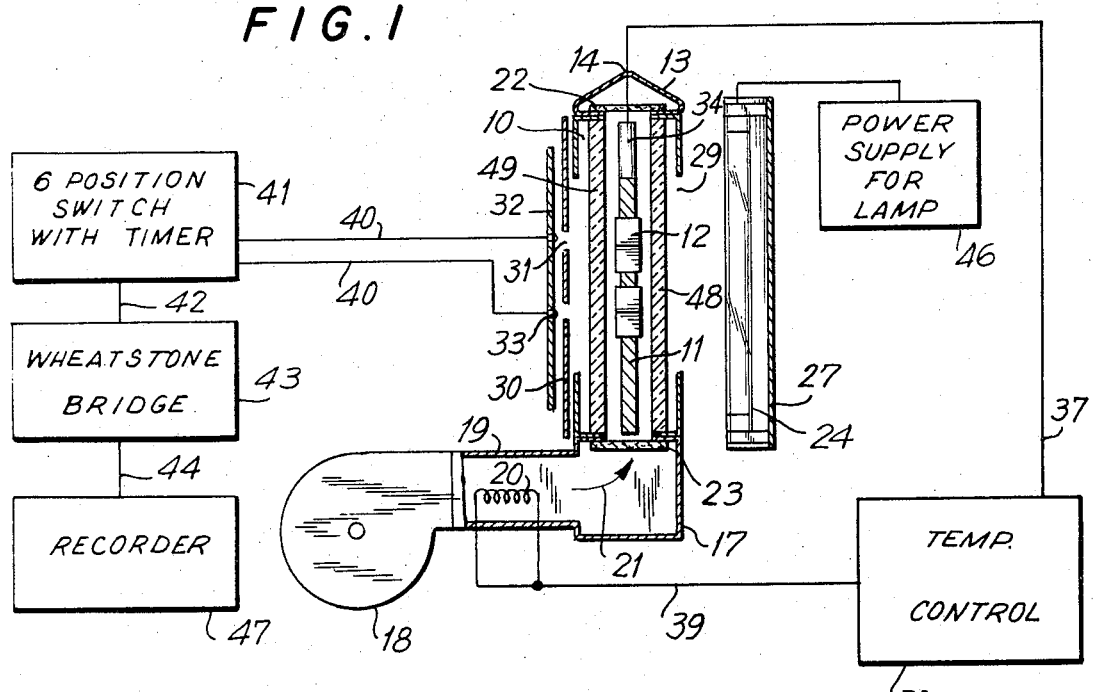
FIG. 1 is a somewhat diagrammatic sectional indication of a testing device for imparting and measuring simultaneously the degradation of resin samples by the impartation of actinic radiation thereto and including circuit and mechanical aspects of apparatus embodying and for practicing this invention.

Referring to the drawings, in which like characters of reference refer to like parts throughout the several views thereof, FIG. 1 illustrates the invention as employed in conjunction with a recorder and a six-position switch with timer therefor for measuring the effect of actinic radiation on a plurality of resin samples containing stabilizers for inhibiting degradation of the samples by the actinic radiation.

In FIG. 1, a specimen compartment is designated generally as 10, having a removable cover 13 disposed on the top thereof. In the center of the specimen compartment 10 a sample holder 11 is positioned having disposed thereon a plurality of samples 12 for testing. In the center of cover 13 is an opening 14, the purpose for which will be described below.

Disposed on the bottom of the specimen compartment 10 is a plenum chamber 17 in flow communication with a fan 18, as through a duct 19. Extending into duct 19 is a heating element 20 for heating air driven by fan 18 as it passes through duct 19 into plenum chamber 17. The heated air is directed, as is indicated by arrows 21 toward and into specimen compartment 10 wherein the heated air passes up through and around specimens 12, and thereafter through the opening 14 in cover 13. Foraminous metallic plates 22 and 23 may be disposed at the upper and lower extent of compartment 10 to aid in air diffusion although their use is not necessary for carrying out this invention.

Disposed on the upper portion of sample holder 11 is a thermocouple 34 for measuring the temperature in the specimen compartment 10. Thermocouple 34 is connected to a temperature control 38 as through line 37, with the temperature control being in turn connected to the heating element 20 as through line 39. With such an arrangement, the thermocouple measures the temperature of the heated air passing through specimen compartment 10, and through temperature control 28 controls the heating element 20 to maintain an even and constant temperature in specimen compartment 10 surrounding samples 12 disposed therein.

On the right hand side of specimen compartment 10 is lamp 24 which may be any convenient source of actinic radiation, such as, for example, a medium pressure mercury arc lamp. Surrounding one side of lamp 24 is a reflector 27 to reflect the rays of lamp 24 toward the specimens 12 disposed in the specimen compartment 10. Positioned between lamp 24 and the specimens 12 is a glass filter element 48 for filtering the rays emanating from lamp 24. Filter 48 may be of any well known glass filter material such as, for example, Vycor, a high silica glass especially transparent to actinic light. A lamp housing, not shown for clarity, is disposed around the lamp and reflector therefor to prevent light rays emanating in other than the desired direction, as well known.

Between filter 48 and lamp 24 is a shutter space 29 into which a shutter, not shown, is disposed when, for some reason, the operator wishes to cut off radiation from the lamp to the samples momentarily. The shutter may be manually operated to open and close the shutter space 29. However, it is within the purview of this invention that a mechanically operated shutter may be used which would operate to open mechanically and automatically when the radiation from lamp 24 had reached its proper intensity for impartation of the desired radiation to samples 12 in specimen compartment 10.

Arranged adjacent the left hand side of sample holder 11 is a further glass filter 49 which may be of any desired low transparency glass such as, for example Pyrex, in order to protect the photocells described below from excessive radiation.

Disposed on the left hand side of the specimen compartment 10 is a photocell plate 32 having positioned thereon a plurality of photocells 33 arranged to be directly opposite each of the plurality of specimens 12 disposed on the holder 11. Disposed between the photocell holder 32 and the glass filter 49 is a baffle 30 having a plurality of openings 31 therein. Baffle 30 serves to prevent any light radiating from lamp 24 from activating photocells 33 except that light radiating through samples 12. As is readily apparent, openings 31 are immediately adjacent photocells 33 and samples 12 for this purpose.

A six-position switch with timer 41 is connected as through lines 40 to the photocells 33. The switch with timer may be any well-known device which permits variation of the time spent on each switch position so that each of the samples may be measured for a specified time interval to measure the effects of radiation on the particular samples being tested after desired time intervals of radiation. The six-position switch with timer may be, for example, Bausch & Lomb "Multi-Chart." The switch is connected through a wheatstone bridge arrangement 43 to a recorder 47 as through lines 42 and 44. The recorder 47 records the readings of the photocell testing the plurality of specimens 12 to read the effects of radiation emanating from lamp 24 on the samples 12 and discoloration caused on the samples 12 by the radiation from the lamp 24.

Figure 3:
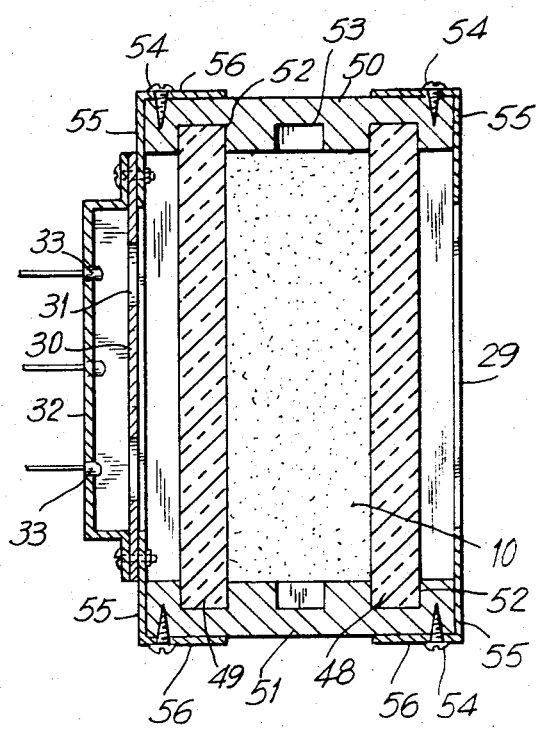
FIG. 3 is an enlarged top plan view of the specimen compartment of FIG. 1 with the sample holder removed.

As best shown in FIG. 3, glass filters 48 and 49 can be readily slipped into and out of slots 52 disposed in end walls 50 and 51 respectively of the specimen compartment 10 so that different filtering characteristics can be obtained. A plurality of different specimen holders may be inserted in slots 53, as shown in FIG. 3. Side walls 55 of chamber 10 are held in place, as by any well-known means such as, for example, bolts 54 passing through flanges 56 extending from the side walls 55, as is shown in FIG. 3.

Figure 4:
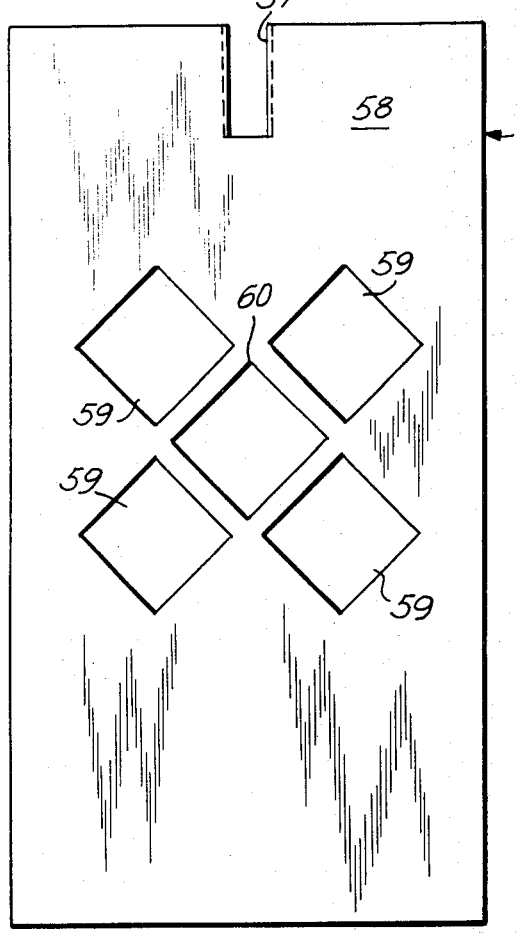
FIG. 4 is an enlarged plan view of a sample holder and showing the arrangement of the samples thereon for measurement in accordance herewith.
Figure 2:
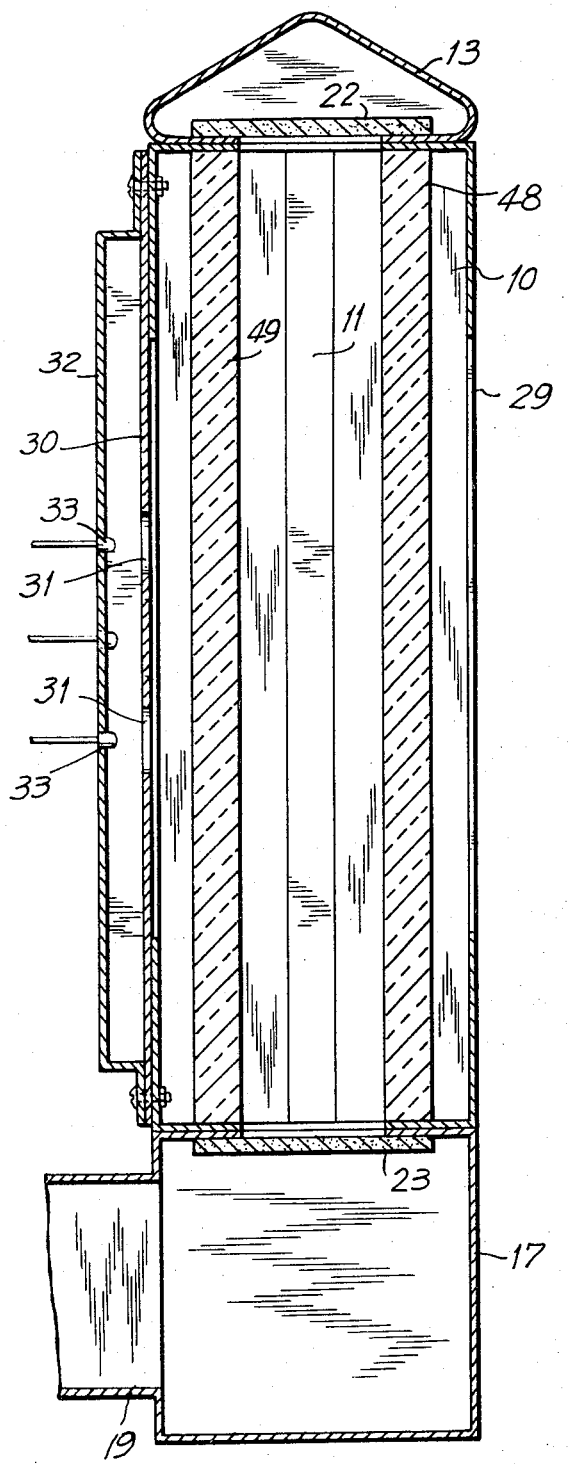
FIG. 2 is an enlarged sectional view of the specimen compartment of the apparatus in accordance herewith and showing the plenum chamber disposed at the bottom thereof and the arrangement of filters on either side of a sample holder, not shown, which would be disposed therein.

An enlarged view of a sample holder 11 is shown in FIG. 4 showing the arrangement of the various sample pockets 59 disposed in the sample holder. Portion 58 of the sample holder is opaque so that radiation emanating from lamp 24 passes only through the spaces 59, as well as center space 60 which is used to measure the radiation intensity from lamp 24 without any sample interposed therebetween. In the upper portion of sample holder 11 is a thermocouple well 57 into which the thermocouple is disposed after the sample holder has been slipped into the specimen compartment 10.

FIG. 6 is a diagramatic indication of the electrical circuitry connected to the apparatus herein and showing photocells 33 connected to six-position switch 41 as through lines 40. Open position 45 is for taking a zero or "black" reading so as to indicate the highest point of the range in accordance herewith. Recorder 47 is shown connected to switch 41 as through lines 42, 62 and variable resistances 63 and 64. Furthermore, mercury cell 46 is connected in series with resistance 64 as through lines 69 and 70 with switch 68 being interposed in line 69.

In operation, the samples are placed in sample holder 11 and it is placed in the specimen chamber 10, with the shutter closed. Thereafter, the temperature of the sample chamber is raised to the desired set point. This is achieved by thermocouple 34 which varies the voltage on the heating coil 20 as through the temperature control 38. Preferably the temperature control is operated in conjunction with a digital set point unit (West PSCR-15-20 and JYSCR) as well known. The set point unit has a range of between about 0° and 500° C., with a counter that reads 0 to 1,000. An ice water reading is .003 and boiling water is 196. Thereafter, the band width control is set at maximum, and the desired temperature is set on the set point unit. In this connection, the set point may be up to 100° C. With this arrangement, the temperature indicator reaches the set point quickly and remains very steady during the exposure.

As is obvious, the actual temperature of the front faces of the samples is not known. The temperature is somewhere between the air temperature and a "black panel" temperature reading so that the sample face achieves some independent temperature level between the two. Nevertheless, the temperatures of the samples are directly related to the temperature of the thermocouple.

In the illustrated embodiment, a 4 inches long illuminated tube was used with the four samples being positioned 1-¾ inches from the front of the light tube. Center sample space 60 is left blank so that a reference beam (maximum light) can be read in sequence with the four samples. The timer used permits variation of the time spent on each switch position from about 5 to about 50 seconds. It has been found, in accordance herewith, that good results are obtained by using between 10 and 15 seconds per position. It should be understood, however, that it is within the purview of this invention that the various photocell positions may be measured simultaneously rather than sequentially with the only difference being that a different recorder capable of recording six readings at once may be used, as well known in the art.

As is readily apparent, the various positions 59A, 59B, 59C and 59D in the sample holder may provide certain variations in results. Therefore, in order to determine the effect of position in the sample holder on the time and the "slope," which is the measure of the maximum rate of discoloration, eleven different samples were tested once in each of the four positions in separate runs. The average times and slopes are given in Table I, below. In Table I, "slope" is "millivolt rise in 10 minutes."

TABLE I

| POSITION | | TIME-MIN. | | SLOPE | |
|---|---|---|---|---|---|
| Left | Right | Left | Right | Left | Right |
| Upper | | | | | |
| 59A | 59C | 22.2 | 23.3 | 31.7 | 34.3 |
| Lower | | | | | |
| 59B | 59D | 22.0 | 22.3 | 22.2 | 19.4 |

Because of the differences observed among the various positions, as is noted in Table I, routinely, results are reported as the average time and slope for a sample run 4 times, once in each of the four positions at different times.

As purely illustrative of the results achieved in accordance herewith sample sheets of polyvinyl chloride were prepared containing different stabilizer systems, and readings were taken in order to provide an indication of the different response to actinic radiation of samples containing the different stabilizer systems.

The polyvinyl chloride used was Geon 103EPF7 (a polyvinyl chloride product of the B. F. Goodrich Company). Each of the samples contained 0.5 phr of stabilizer in them. The various resin compositions to be studied were milled for 5 minutes on a 2-roll mill at 325° C. mill temperature to form sheets about 40 mils thick. Two portions of each sheet each about 1-½ inches by 7-½ inches were pressed for 1 minute at 380° F. (190°C.) between ferrotype sheets at a pressure of 20 tons on a 9 inch ram, and cooled quickly on another press at a pressure of 5 tons on a smaller ram. The thin smooth sheets that were obtained were cut into squares of 1-7/16 inches on a side to provide the samples for the sample holder 11. Samples were obtained containing four different stabilizer systems. FIG. 7 is representative of the results obtained from testing the four different stabilizer systems. In obtaining the readings for FIG. 7, readings were taken between about 10 and 15 seconds per position, with the temperature being maintained at 100° C. The traces in FIG. 7 show the typical four S-shaped curves obtained, in accordance herewith. Trace A is representative of the polyvinyl chloride sample noted above containing 0.5 phr of dibutyltin dilaurate. The sample of Trace B contained 0.5 phr of dibutyltin bis(isooctyl mercaptoacetate). The sample of Trace C contained 0.5 phr of dibutyltin maleate, and the sample of Trace D contained a combination stabilizer system of 0.5 phr of dibutyltin bis(cyclohexyl maleate) and 2,6-di-t-butyl p-cresol.

FIG. 8 shows the effect on the induction period of a particular stabilizer contained in a set of samples of a particular resin and the variations caused by the differences in concentration of a particular stabilizer and at different operating temperatures. It is a correlation of data from a plurality of samples and obtained in a manner such as shown in FIG. 7. The samples providing this illustration were standard PVC formulations containing 1 part per 100 parts resin (phr) of dibutyltin dilaurate. The samples contained varying amounts of a hindered phenolic anti-oxidant (2,6-di-t-butyl p-cresol), these concentrations being 0.0125, 0.025, 0.05, 0.1 and 0.2 phr. The sample sheets of PVC containing these particular stabilizers were tested with a control at 45°, 60°, 80° and 100° C. The dependence of the length of the induction period on the concentration of the anti-oxidant and on temperature is illustrated in FIG. 8. The most important characteristic that is apparent in the Figure is that for each temperature there is an optimum concentration of the anti-oxidant (around 0.025 phr) for which the induction period is maximized. Higher concentration of the anti-oxidant shortens the induction periods significantly. The temperature effect is more complex. The induction period is quite sharply decreased when the temperature is raised from 80° to 100° C. over the full range of concentration of the anti-oxidant. Considering the effect of raising the temperature from 45° to 80° C., a similar decrease in the induction period arises if no anti-oxidant is present. However, as the concentration of anti-oxidant increases, the decrease of the induction period gets progressively smaller and eventually the induction period increases with increasing temperature.

With regard to glass filters 48 and 49, it should be understood that it is within the purview of this invention that these glass filters need not be used. However, their use is preferred merely because, as well known, it enables the user to determine more precisely the wave length of light being used. For example, Pyrex glass filters the light to the extent where all of light with a wave length less than 280 nm (nanometer — $10^{-9}$ meter) is removed. Obviously, the use of filters provides testing of the characteristics of various stabilizer systems to exposure to different wave lengths of light and exposure may be controlled more precisely for different purposes.

As further illustrative of the results achieved in accordance herewith, four different commercial stabilizer systems were compared for their effects on photodegradation of PVC. The four stabilizer systems tested were dibutyltin dilaurate, dibutyltin maleate, a combination of dibutyltin bis(cyclohexyl maleate) with 2,6-di-t-butyl p-cresol, and dibutyltin bis(isooctyl) mercaptoacetate). Milled sheets were prepared in the same manner as noted above in the discussion of the trace showings of FIG. 7, with the sheets containing 0.5, 1 and 2 phr of each of the four stabilizer systems noted above. The sheets were pressed and tested at 45°, 60°, 80° and 100° C. using the methods and apparatus in accordance herewith. Each sheet was tested in all four positions in sample holder 11 at different times and at all four temperatures. The results obtained are set forth in Table II, below.

TABLE II

PHOTODEGRADATION DATA FOR PVC STABILIZER WITH FOUR STABILIZERS

| Stabilizer, phr Temperature, °C: | Induction Period, Minutes | | | | Maximum Rate of Discoloration | | | |
|---|---|---|---|---|---|---|---|---|
| | 45° | 60° | 80° | 100° | 45° | 60° | 80° | 100° |
| dibutyltin dilaurate | | | | | | | | |
| 0.5 | 31.9 | 20.3 | 13.4 | 10.4 | 8.8 | 17.3 | 25.3 | 45.8 |
| 1.0 | 41.4 | 31.1 | 20.1 | 15.7 | 9.5 | 17 | 33.8 | 57 |
| 2.0 | 58.9 | 42.1 | 32.8 | 24.0 | 10.5 | 18 | 40.3 | 64.5 |
| dibutyltin maleate | | | | | | | | |
| 0.5 | 45.1 | 31.8 | 22.5 | 15.5 | 8.3 | 18.5 | 35.5 | 74.5 |
| 1.0 | 58 | 45.4 | 31.5 | 20.5 | 8 | 15.5 | 30.5 | 70.3 |
| 2.0 | 70 | 60.9 | 44.4 | 27.6 | 6 | 10.8 | 24 | 48.3 |
| dibutyltin bis (cyclohexylmaleate)& 2,6-di-t-butyl p-cresol | | | | | | | | |
| 0.5 | 37.3 | 30 | 22.0 | 16.6 | 8.3 | 19.8 | 27.5 | 51.3 |
| 1.0 | 50.1 | 36.5 | 30.8 | 23.2 | 7 | 18.3 | 33.5 | 69.8 |
| 2.0 | 57.9 | 48.0 | 45 | 31.9 | 8.5 | 18 | 42.5 | 54.3 |
| dibutyltin bis (isooctyl mercaptoacetate) | | | | | | | | |
| 0.5 | 32.8 | 30.5 | 23.4 | 16.6 | 6.8 | 9.3 | 13.3 | 19.3 |
| 1.0 | 50.8 | 37.1 | 27.8 | 20.2 | 6.3 | 11 | 12.5 | 15.3 |
| 2.0 | 58.9 | 43.9 | 36.0 | 25.0 | 4.5 | 6.3 | 8.5 | 9.8 |

In viewing this Table, certain impressions can be observed from the results. For example, strong similarities among the various stabilizer systems tested can be noted, except that the dibutyltin bis(isooctyl mercaptoacetate) suppresses the maximum rate of discoloration quite noticeably. Also, it is obvious that temperature is an important variable in photodegradation. Furthermore, it can be seen from the Table that overall dibutyltin maleate provides the longest protection. However, since the formula weight of dibutyltin maleate is only 347 compared to 640 for dibutyltin bis(isooctyl mercaptoacetate), the maleate would probably have less effect than the dibutyltin bis(isooctyl mercaptoacetate) on an "equal tin" (equimolar) basis because the concentration by weight would be smaller.

On a more general basis, the data in Table II confirms the well-known fact that light causes degradation of PVC. With regard to general theory of photo-oxidation, it was found that PVC by itself yields a typical S-shaped curve of discoloration versus time with a definite induction period, (the "induction period" being that period prior to the time when a definite indication of discoloration or breakdown of the resin by light radiation is obvious). The existence of the induction period implies that some reactive structure such as, for example, unsaturation or peroxides, is accumulative, and therefore, initiates discoloration by zipper dehydrochlorination. The decreasing rate of discoloration beyond the inflection point is probably attributable to increasing protection of the underlying material by the discolored material on the exposed surface of the resin sample. As is readily apparent from Table II, dibutyltin dilaurate substantially increases the induction period, but not in direct proportion to its concentration. Probably, the alkyltin competes with oxygen to react with photoinduced-free radicals. It is well known that free radicals may exist in PVC since it has been reported that when PVC is irradiated in the presence of dibutyltin diacetate, butyl groups add on to the polymer.

Further, although increased concentration of dibutyltin dilaurate increases the maximum rate of discoloration, it does not inhibit the part of the discoloration process caused by decomposition of peroxides. The phenolic anti-oxidant 2,6-di-t-butyl p-cresol increases the induction period at low concentration, but decreases it at higher concentration. Furthermore, this phenolic anti-oxidant has little effect on the maximum rate of discoloration. Probably, the hindered phenol intercepts free radicals, thus deactivating them, but at the same time forms peroxides that initiate degradation. This is also apparent from the data in Table II in that the additional peroxides formed in this manner have little effect on the maximum rate of discoloration.

Further evidence for the presence of peroxides in the degradation is that the dibutyltin bis(isooctyl mercaptoacetate) which contains sulfur counteracts the adverse effect of excess phenolic anti-oxidant on the induction period and suppresses the maximum rate of discoloration. Increased concentrations of the dibutyltin bis(isooctyl mercaptoacetate) further suppress the maximum rate of discoloration in contrast to the effect of the dibutyltin dilaurate.

In a further comparison of the differences between thermal degradation and photodegradation, it can be estimated from the data in Table II from the induction period and temperature data for PVC stabilized with one phr of dibutyltin dilaurate, that an activation energy of about 1 kcal/mole is present. This differs markedly from values of about 30 kcal/mole obtained during thermal degradation studies. Whereas it is apparent from all of the data contained herein that photodegradation kinetics are sensitive to temperature, it is obvious that most of the activation energy for photodegradation comes from the light that is absorbed.

Accordingly, there are provided, in accordance herewith, methods and apparatus for providing data indicating systematic, quantitative relationships between the extent of degradation, compositions of resin samples being tested, and the temperature of the exposure. Furthermore, these relationships can be evaluated quickly and in a deliberate manner so as to enable practitioners in the art to determine the effectiveness of a newly developed stabilizer system in a short period of time and under conditions which he himself may set up. The latter is most appropriate since certain stabilizer systems are directed to certain photodegradation problems while certain other stabilizer systems are directed to other problems.

With the methods and apparatus herein, the test environment can be determined deliberately for the particular stabilizer system being developed. Further, such methods and apparatus provide for the simultaneous impartation of radiation to the samples being tested with constant monitoring and reading of the effects of this radiation so that at any moment in time during the radiation impartation procedure, readings can be taken to determine the extent of discoloration for that particular time interval and in a manner whereby the samples being tested are maintained in a constant temperature environment pre-selected as desired.

Also, all of the readings and data obtained herein are recorded mechanically and precisely at the time the data is read so that no misleading information can be interposed by the surrounding environment when the readings are being taken. Obviously, and most importantly, the impartation and testing procedure herein is carried out over a substantially shorter period of time than would be necessary under natural exposure conditions so that newly developed stabilizer systems can be routinely tested and evaluated over a much shorter period of time than was the case in the past.

While the methods and forms of apparatus herein described constitute preferred embodiments of the invention, it is to be understood that the invention is not limited to these precise methods or forms of apparatus, and that changes may be made therein without departing from the scope of the invention which is defined in the appended claims.

What is claimed is:

1. In apparatus of the character described for testing the effectiveness of the stabilizer content of a plurality of resin samples against actinic radiation by the simultaneous impartation to and measurement of the photodegradation of said resins by said radiation, and having a sample testing compartment with a perforated removable cover for inserting said samples therein, a shutter disposed in one side thereof, and a source of electric current, the combination which comprises fan means connected to said source of current and in flow communication with said compartment for providing a continuous flow of heated air through said compartment, temperature sensing means in said compartment and connected to said fan means for sensing the temperature of said heated airflow and maintaining said heated air at a preselected temperature, a source of actinic radiation connected to said source of current and disposed adjacent said shutter for imparting said radiation to and through said samples, a plurality of photocells disposed in the side of said compartment diametrically opposite said shutter for sensing the radiation passing through a plurality of samples disposed in said compartment from said source, switch means connected to said source of current and with said plurality of photocells for selectively activating individual ones of said photocells for sensing the radiation coming from its respective sample, and recording means connected with said switch means for recording the sensing results of the said plurality of photocells.

2. Apparatus as described in claim 1 which also includes filter means disposed between said source and said samples and between said samples and said plurality of photocells for filtering and selecting the degree and range of the said radiation from the said source.

3. Apparatus as described in claim 1 in which said source is a medium pressure mercury arc lamp, and which also includes a reflector disposed adjacent said lamp for directing said radiation toward said samples.

4. Apparatus as described in claim 1 in which said temperature sensing means is a thermocouple, said fan means includes a heating element disposed in said flow communication between said fan means and said compartment, and which also includes a temperature control connected between said thermocouple and said heating element for controlling said heating element in response to said thermocouple.

5. Apparatus as recited in claim 1 which also includes a timer connected to said switch means for determining the time interval for activating the individual ones of said photocells, said timer having means for pre-selecting the length of said time intervals.

6. Apparatus as recited in claim 1 which also includes a sample holder for insertion into said compartment, said sample holder having a plurality of cut-out pockets disposed therein for insertion of a plurality of samples to be tested, and a baffle plate disposed between said photocells and said sample holder, said baffle plate having a plurality of openings therein arranged to correspond to said pockets and the respective photocells on opposite sides thereof.

7. In a method for testing the effectiveness of the stabilizer content of a plurality of resin samples against actinic radiation, the steps which comprise arranging a plurality of resin samples in a pattern in a testing zone, maintaining a pre-selected constant temperature in said testing zone, applying actinic radiation to said samples in said zone after the temperature thereof has reached said pre-selected temperature, sensing the said radiation passing through the said samples for pre-selected time intervals while said applying step is still being carried out, and recording the degree of radiation sensed in relation to the said pre-selected time intervals.

8. The method as described in claim 7 which includes the additional step of filtering the said radiation applied to said samples in said applying step.

9. The method as described in claim 7 in which said sensing step for sensing the said radiation passing through said samples is carried out simultaneously for said plurality of samples for pre-selected time intervals.

10. The method as described in claim 7 in which said sensing step for sensing the said radiation passing through said samples is carried out sequentially in pre-selected increments of time for each sample being sensed.

* * * * *